United States Patent [19]

Nopper

[11] Patent Number: 4,592,008

[45] Date of Patent: May 27, 1986

[54] OVERFLOW DETECTOR FOR ALGEBRAIC ADDERS

[75] Inventor: Guido H. Nopper, Umkirch, Fed. Rep. of Germany

[73] Assignee: ITT Industries, Inc., New York, N.Y.

[21] Appl. No.: 461,792

[22] Filed: Jan. 28, 1983

[30] Foreign Application Priority Data

Feb. 18, 1982 [EP]  European Pat. Off. ........ 82101201.0

[51] Int. Cl.⁴ .............................................. G05F 7/50
[52] U.S. Cl. .................................... 364/784; 364/737
[58] Field of Search ........ 364/736, 737, 768, 784–788, 364/745, 715

[56] References Cited

U.S. PATENT DOCUMENTS

| | | | |
|---|---|---|---|
| 3,016,193 | 1/1962 | Brett et al. | 364/737 |
| 3,720,821 | 3/1973 | Heightley | 364/773 |
| 3,789,206 | 1/1974 | Heightley | 364/715 |
| 4,215,415 | 7/1980 | Kanemasa et al. | 364/745 |
| 4,223,389 | 9/1980 | Amada et al. | 364/745 |
| 4,282,581 | 8/1981 | Bondurant et al. | 364/737 |

Primary Examiner—James D. Thomas
Assistant Examiner—Dale M. Shaw
Attorney, Agent, or Firm—Donald J. Lenkszus

[57] ABSTRACT

An MOS high-speed overflow detector for algebraic adders which add two binary numbers (a,b) in two's complement notation and contain one full adder per digit which provides a sum signal (s) and a carry signal (c) consists of a complex gate (k) made up of three two-input AND elements (u1, u2, u3). The outputs of the three AND elements are NORed. The two inputs of the first AND element (u1) are fed with the sign signal (va) of the first binary number (a) and with the inverted sign signal ($\overline{vb}$) of the second binary number (b), respectively. The two inputs of the second AND element (U2) are fed with the sign signal (vb) of the second binary number (b) and with the sum signal (vs) of the full adder (av) of the sign digit, respectively. The two inputs of the third AND element (u3) are fed with the inverted sum signal ($\overline{vs}$) and the inverted sign signal ($\overline{va}$) of the first binary number (a), respectively.

3 Claims, 3 Drawing Figures

OVERFLOW DETECTOR FOR ALGEBRAIC ADDERS

BACKGROUND OF THE INVENTION

The present invention relates to an overflow detector for algebraic adders.

When calculating with algebraic, i.e., positive and negative, binary numbers, these numbers are usually provided with a sign digit which characterizes them as positive or negative. Positive binary numbers are commonly designated by the sign digit 0, and negative ones are designated by the sign digit 1. Since, in algebra, no distinction is made between the rules of addition and those for subtraction, but only the rule of addition is applied to positive and negative numbers, negative binary numbers are represented and added in two's complement, for example; this eliminates the need to switch the adder to subtraction and reduces the complexity of the circuit. Subtraction is thus performed by adding the two's complement of the subtrahend by means of the same full adder as that used for addition.

If two numbers with like signs are added, the capacity of the number representation may be exceeded, so that the result becomes invalid. If the numbers to be added are positive, the sum will also be positive, but if the sign digit is a 1 instead of a 0 and, thus, falsely makes the result appear as a negative number, a positive "overflow" has arisen.

If both the augend and the addend are negative, the result is also negative; the occurrence of a 0 instead of a 1 in the sign position characterizes a "negative" overflow.

The respective false digit is caused by the carry signal c coming from the most significant full adder. In both cases of overflow, the (false) change of state in the sign position not only results in a false sign but falsifies the whole result, because a positive number with a "false" negative sign also has a false numerical value.

According to a book by U. Tietze, Ch. Schenk, "Halbleiterschaltungstechnik", 5th Edition, Springer-Verlag Berlin, Heidelberg, New York, 1980, page 482, the following equation holds for the overflow signal fl:

$$fl = \overline{va} \cdot \overline{vb} \cdot vs + va \cdot vb \cdot \overline{vs}$$

An overflow detector implemented in accordance with this equation using MOS technology consists of a complex gate made up of two NORed three-input AND elements and followed by an inverter. Such a circuit is slow because the delay is determined by two gates connected in series with respect to the signal flow.

SUMMARY OF THE INVENTION

The invention solves the problem of how to provide a less complex and faster circuit. The solution of the invention is to provide a MOS high-speed overflow detector which adds two binary members (a, b) in two's complement notation and contain one full adder per digit.

One advantage of the invention follows directly from the solution of the problem: The speed of the overflow-signal generation is practically twice as high as in a prior art arrangement. Another advantage lies in the less complex layout of the circuit.

BRIEF DESCRIPTION OF THE DRAWING

The invention will now be explained in more detail with reference to the accompanying drawing, in which.

DESCRIPTION OF THE PREFERRED EMBODIMENTS

Figure 1:
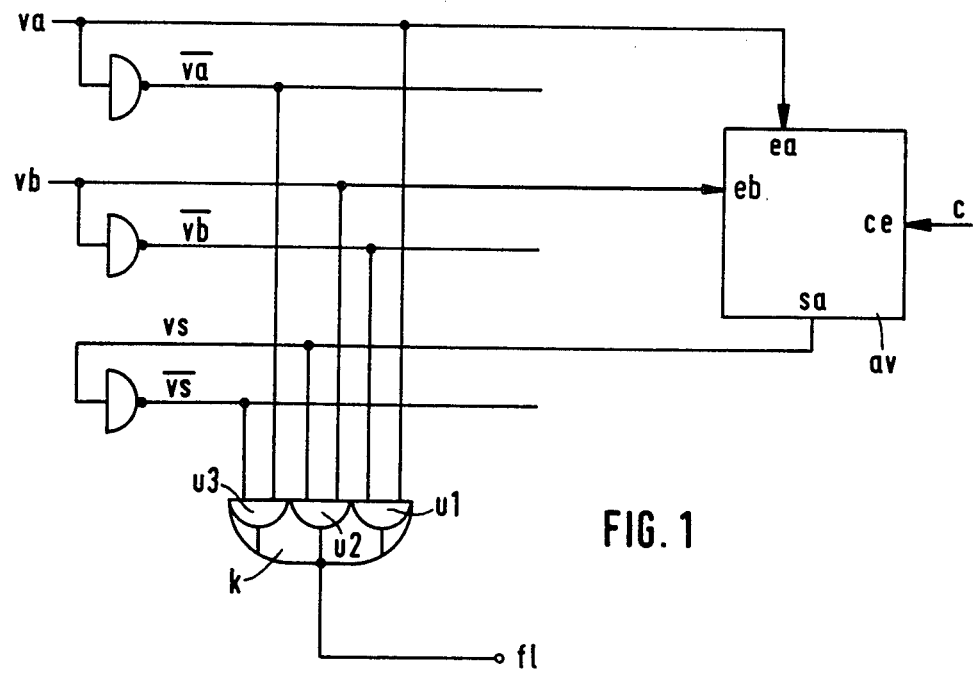
FIG. 1 is a circuit diagram of an embodiment of the invention.

In the embodiment of FIG. 1, the complex gate k consists of three AND elements u1, u2, u3, whose outputs are NORed. Each of the AND elements has two inputs. The inputs of the first AND element u1 are fed with the sign signal va of the first binary number to be added, a, and with the inverted sign signal $\overline{vb}$ of the second binary number to be added, b, respectively. The two inputs of the second AND element u2 are supplied, respectively, with the sign signal vb of the second binary number b and with the sum signal vs provided by the sum output sa of the full adder av of the sign digit. The aforementioned sign digits va and vb are applied to the inputs ea and eb, respectively, of the full adder av. The carry signal c from the most significant full adder (not shown) is applied to the carry input ce. The signals inverted from the signals va, vb, vs are produced by the inverters shown. The inverted sum signal $\overline{vs}$ and the inverted sign signal $\overline{va}$ of the first binary number a are each applied to one input of the third AND element u3. The output of the complex gate k provides the overflow signal fl in noninverted form.

Figure 2:
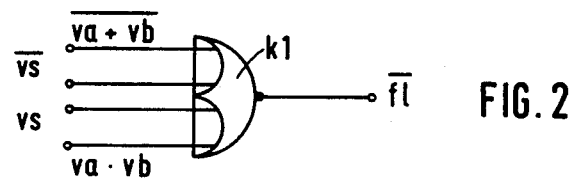
FIGS. 2 and 3 are circuit diagrams of simplified overflow detectors for special types of adders.
Figure 3:
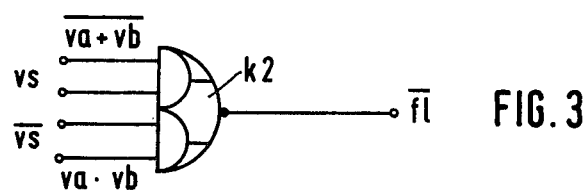

FIGS. 2 and 3 show simplified overflow detectors which are suitable for special adders, namely for adders which, in positive logic, provide the signals va·vb, $\overline{va + vb}$, vs, $\overline{vs}$.

Such adders are disclosed in applicant's prior European Application 81 10 6668.7. The signals va·vb and $\overline{va + vb}$ are provided there by the NOR gates 7i or 8j and 8i or 7j, respectively. Depending on whether a full adder according to stage i or according to stage j is used in the sign position of the adder of the invention, the signals va·vb or $\overline{va + vb}$ are obtained. The signal vs is produced in both stages, i, j, and an inverter must be provided for forming the signal $\overline{vs}$.

FIG. 2 shows the complex gate k1, which consists of two NANDed OR elements each having two inputs, and whose output provides the inverted overflow signal $\overline{fl}$. The signals $\overline{va + vb}$ and $\overline{vs}$ are applied to one OR element, and the signals vs and va·vb are applied to the other OR element.

The complex gate k2 of FIG. 3 consists of two NORed two-input AND elements and provides the inverted overflow signal $\overline{fl}$. The signals va·vb and $\overline{vs}$ are applied to one OR element, and the signals vs and $\overline{va + vb}$ are applied to the other OR element. Finally it should be noted that in the foregoing description, the term " ... gate" refers to logic circuits which have a load resistor. In the figures, such gates are represented by those symbols where a dot, commonly used to denote that inversion occurs, is placed at the output point. For the purposes of the foregoing description, a distinction was therefore made between a " ... gate", which is such a circuit with a single load resistor, and an " ... element", which is only part of a " ... gate" and has no load resistor of its own.

I claim:

1. Insulated-gate field-effect transistor (MOS) integrated overflow detector for algebraic adders which add two binary numbers (a, b) in two's complement notation and contain one full adder per digit which provides a sum signal and a carry signal, comprising:
   a complex gate (k) consisting of three two-input AND elements (u1, u2, u3), with
   the outputs of the three AND elements NORed,
   the two inputs of the first AND element (u1) being fed with the sign signal (va) of the first binary number (a) and with the inverted sign signal ($\overline{vb}$) of the second binary number (b), respectively,
   the two inputs of the second AND element (u2) respectively being fed with the sign signal (vb) of the second binary number (b) and with the sum signal (vs) provided by the full adder (av) of the sign digits, and
   the two inputs of the third AND element (u3) being fed with the inverted sum signal ($\overline{vs}$) and with the inverted sign signal ($\overline{va}$) of the first binary number (a), respectively.

2. An overflow detector for algebraic adders which add two binary numbers (a,b) in two's complement notation and contain one full adder for the sign digit and wherein, in positive logic said full adder of the sign digit provides the signals va·vb, va+vb, vs, and $\overline{vs}$, where va is the sign signal of the first binary number (a), vb is the sign signal of the second binary number (b), vs is the sum signal and $\overline{vs}$ is the inverted sum signal said detector comprising:
   a complex gate (k1) comprising two two-input OR elements having their outputs NANDed, the signals va+vb and $\overline{vs}$ being applied to one of the two OR elements, and the signals va·vb and vs being applied to the other OR element, the output of said complex gate providing an inverted overflow signal ($\overline{fl}$).

3. An overflow detector for algebraic adders which add two binary numbers (a,b) in two's complement notation and contain one full adder for the sign digit and wherein, in positive logic, said full adder of the sign digit provides the signals va·vb, va+vb, vs, and $\overline{vs}$, where va is the sign signal of the first binary number (a), vb is the sign signal fo the second binary number (b), vs is the sum signal and $\overline{vs}$ is the inverted sum signal said detector comprising:
   a complex gate (k2) comprising two two-input AND elements having their outputs NORed, the signals $\overline{va+vb}$ and vs being applied to one of the two AND elements, and the signals va·vb and $\overline{vs}$ being applied to the other AND element, the output of said complex gate providing an inverted overflow signal ($\overline{fl}$).

* * * * *